Aug. 17, 1954
J. L. GRATZMULLER
2,686,533
DIAPHRAGM TYPE SAFETY VALVE
Filed April 24, 1950
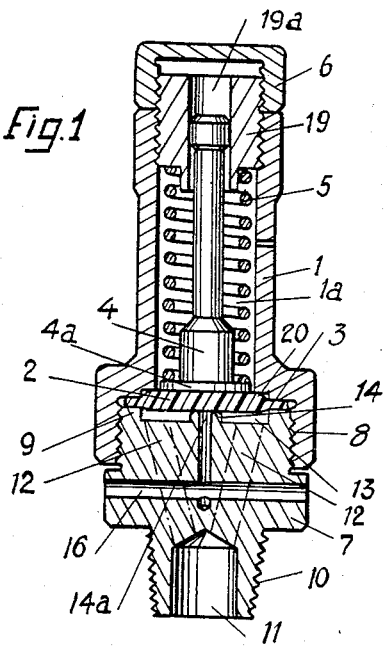
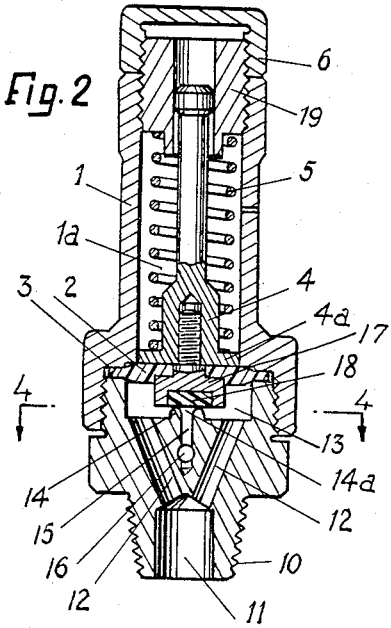
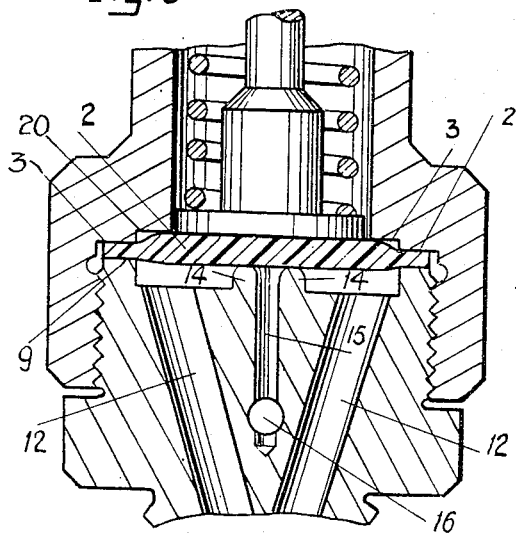
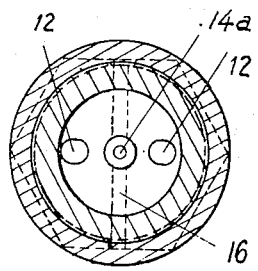
INVENTOR
Jean Louis GRATZMULLER
By Wenderoth, Lind & Ponack
ATTORNEYS Patented Aug. 17, 1954

2,686,533

UNITED STATES PATENT OFFICE 2,686,533

DIAPHRAGM TYPE SAFETY VALVE

Jean Louis Gratzmuller, Paris, France

Application April 24, 1950, Serial No. 157,789

Claims priority, application France April 28, 1949

3 Claims. (Cl. 137—510)

This invention relates to safety valves to be mounted on ducts or tanks containing a pressure fluid, said valves being so calibrated that they automatically open when said pressure has reached a well defined value. In the conventional safety valves in which the surface which is acted upon by the pressure to be controlled is equal to and generally identical with the seating surface of the movable closing member of the valve, fluid tightness can be obtained only by providing a sufficient seating force for said member, which is obtained only by tolerating a situation in which absolute fluid tightness is only obtained at a pressure materially lower than the pressure at which the valve opens and discharges.

To overcome this drawback, it has been proposed to mount the movable member of the valve on a resilient diaphragm having a very large area with respect to that of the opening to be closed by said member. Thus, since the pressure-responsive area is several times greater than the movable member seating area, the difference between the opening pressure and the tightness pressure is substantially divided by the ratio of said areas. These devices, however, are usually complicated and expensive.

The main object of this invention is to provide a diaphragm type safety-valve of extremely simple and cheap construction and having the same size as a conventional safety valve of the same capacity, while ensuring a considerably higher degree of accuracy and a materially improved closing tightness.

Previously known valves have used diaphragms of relatively stiff strong material. In such previously known valves the operation of the valve has been indeterminate and the stiffness of the diaphragm would substantially modify the operation of the valve and, due to the necessary characteristics of such a diaphragm, the diaphragms are subjected to conditions that cause early mechanical failure of such diaphragm and, just prior to such failure, the weakness of the diaphragm would cause the valve to operate in a manner other than as designed.

One object of the invention is to provide a safety valve that is inexpensive to manufacture and which is reliable in operation.

A further object of the invention is to provide a safety valve in which the pressure into which the valve discharges is relatively material as the area of the discharge passageway which subjects the seating member to back-pressure is small in comparison with the area of the seating member, and the spring pressed piston holding it in closed position.

A further object of this invention is to provide a safety valve that is sealed by a diaphragm or sealing member of soft, normally flat and unstretched material of such a nature that the sealing member transmits the pressure against the surface thereof to the spring pressed piston over substantially the entire area of said piston in all positions of the piston.

A further object of the invention is to provide a supporting surface and clamping means in the body of a safety valve of the piston type to support a sealing element of soft impervious material in normally flat and unstretched condition across the face of the piston so that no piston packing is required, the soft material also operating as gasket means to seal the outlet opening of the valve.

A still further object of the invention is to provide a piston safety valve in which the sealing element to prevent passage of pressure past the piston is a soft unstretched element clamped to the body of the valve and capable of following the piston in its movement in operation.

Other objects and advantages of the invention will appear from the following description with reference to the accompanying drawings in which two embodiments of the invention have been shown as an illustration.

In these drawings:

Fig. 1 is an axial sectional view of a safety valve according to the invention, in which the resilient diaphragm constitutes the active element of the movable closing member.

Fig. 2 is a section similar to Fig. 1 of a safety valve according to the invention, in which the active element of the movable member is constituted by a pad made of a plastic or elastic material more rigid than the diaphragm material and embedded in a metal member secured in the middle of the diaphragm.

Fig. 3 is a partial view of the embodiment of Fig. 1 on a larger scale and sectioned on a different axial plane, and Fig. 4 is a section along line 4—4 of Fig. 2.

In these figures, the corresponding elements have been indicated by the same reference numbers.

Referring first to Fig. 1, there is shown at 1 the valve body which is provided with an axial bore 1a. Said bore comprises, at one end, a portion having a larger diameter adapted to be secured around a plug 7 described hereafter. A shoulder 3 is thus formed between the two portions of bore 1a. A resilient diaphragm 2 is clamped between said shoulder and the upper edge of plug 7 which, in the example shown, is screwed into the above-mentioned larger portion of bore 1a. Said resilient diaphragm is acted upon its face opposite to the plug by a piston 4 loaded by a spring 5 which is calibrated to yield exactly at the desired pressure. This calibration may be varied by means of a nut 19 screwed into the upper end of the cylindrical body 1, said nut being provided with an inner bore 19a ensuring, in cooperation with bore 1a, the axial guiding of piston 4. This axial guiding which takes place at both ends of piston 4 avoids any axial deviation of said piston and thence any play of head 4a of piston 4 with respect to its seating plane.

Nut 19 is locked in the selected seating position by means of a threaded cap 6 screwed onto the portion of nut 19 which projects out of the end of cylindrical body 1.

Plug 7 is screwed into the above-mentioned larger portion of bore 1a by means of a thread 8, its upper edge 9 clamping the peripheral edge of diaphragm 2 against shoulder 3 of body 1. The inner diameter of shoulder 3 is smaller than the inner diameter of the upper edge 9 of the plug, so that the clamping of the diaphragm between these two parts does not prevent the diaphragm from being applied normally against head 4a of piston 4.

Moreover, as best shown in Fig. 3, the shoulder 3 is formed with an annular step 20 such that the whole portion of the diaphragm deformed by the clamping of its outer edge between the remaining portion of shoulder 3 and the upper edge 9 of the plug is accommodated within said step, so that head 4a of piston 4 is applied over its whole area against a substantially plane portion of diaphragm 2. Besides, plug 7 is externally threaded at 10 in its lower portion, which permits screwing of the whole valve assembly onto the duct or tank, the pressure in which is to be controlled. The pressure fluid is admitted through a central bore 11 of plug 7 and through inlet ports 12 whose overall cross-sectional area is substantially equal to the cross-sectional area of central bore 11, into a space 13 located under the diaphragm around an annular lip 14 on which the central portion of diaphragm 2 acted on by the piston head 4a seats, and which surrounds an outlet opening 14a.

The pressure fluid is exhausted through an axial passage 15, and through another passage 16 perpendicular to the axial passage 15. The inlet passage should have the largest practicable cross-section, in order to avoid any appreciable drop of pressure between the container or the like and the pressure chamber 13 of the valve when the latter is discharging, thus ensuring that the discharge takes place under the full pressure of the fluid in the container or the like. The outlet opening 14a may then be of relatively small cross-sectional area sufficient only to ensure the required discharge rate under the critical pressure for the container or the like. The axial planes in which are located the passages 12, on the one hand (shown in Fig. 1 in dotted lines) and the transverse outlet passage 16, on the other hand, are angularly separated with respect to each other around the axis of plug 7. Connecting means (not shown) may lead the exhausted fluid from outlet 16 into an enclosure at suitable pressure to recover said fluid.

It will be seen that this arrangement ensures that the very small opening 14a is effectively sealed by diaphragm 2, which is at the same time subjected to a force sufficient to ensure the closing of the valve. Moreover, all passages ensuring the circulation of the fluid and the control of said circulation are formed in one single piece 7, the screwing of which ensures the clamping of the diaphragm, while it is only necessary to unscrew said piece to release all inner parts of the valve.

The device thus designed comprises but a very small number of elements and is therefore very simple and very cheap to manufacture.

In the example shown in Fig. 2, diaphragm 2 does not bear directly on seat 14. In this embodiment, there is screwed into the piston head 4a a threaded member 17 in which is embedded a pad 18 made of a plastic or elastic material and constituting that portion of the movable member of the valve which cooperates with the seating 14. With this arrangement, it is possible to use, for the diaphragm proper, a material sufficiently resilient to ensure the accuracy of the valve operation and, for the operative closure portion of the movable member, a material sufficiently rigid to resist the mechanical stresses. In this form of construction, the member 17 passes through a central hole in the diaphragm, the margin of which hole is clamped between the member 17 and the piston head 4a.

What is claimed is:

1. In a safety valve the combination with a base member formed with a pressure chamber surrounded by an annular plane clamping surface, at least one inlet passageway to admit pressure fluid into said pressure chamber, an outlet port located axially of said pressure chamber and a valve seat lip surrounding said port to provide a seating surface of restricted area, of a cap member mounted on said base member and having a clamping surface in opposition to the clamping surface of the base member, an annular recessed shoulder in said cap member adjacent its clamping surface and surrounding a cylindrical spring chamber axially aligned with said pressure chamber, a flat faced spring pressed piston slidably mounted in said spring chamber, said recessed shoulder being of a radial width at least equal to the thickness of a normally flat and unstretched sealing element of readily yieldable resilient material having its periphery clamped and compressed between the said clamping surfaces of the base member and the cap member, the depth of recessing of said shoulder from said clamping surface of the cap member being of a dimension of substantially one-half of the difference between the thickness of the uncompressed sealing element and of the compressed sealing element whereby one side of the uncompressed portion of the sealing element lies in unstressed condition across the working surface of said piston and said shoulder, and whereby the other side of the sealing element presents a sealing surface to the said valve seat lip, said spring pressed piston exerting a pressure on the central portion of said sealing element in a direction to press the sealing surface of said sealing element against said valve seat lip to close said outlet port.

2. The device of claim 1 in which the said sealing surface comprises a gasket means of material different from the said sealing element mounted below said sealing element.

3. The device of claim 1, in which the said sealing surface comprises a gasket means mounted in a metallic cup at the under side of said sealing element.

References Cited in the file of this patent

UNITED STATES PATENTS

| Number | Name | Date |
| --- | --- | --- |
| 291,013 | Richardson | Dec. 25, 1883 |
| 347,516 | Sargent | Aug. 17, 1886 |
| 1,496,935 | Lemmon | June 10, 1924 |
| 1,673,470 | Puffer | June 12, 1928 |
| 1,744,087 | Watts | Jan. 21, 1930 |
| 1,871,535 | Lattner | Aug. 16, 1932 |
| 1,988,907 | Lovekin | Jan. 22, 1935 |
| 2,212,709 | Grove | Apr. 27, 1940 |
| 2,487,650 | Grove | Nov. 8, 1949 |